United States Patent

[11] 3,614,613

| [72] | Inventor | Hans A. Brunner<br>Chester, Va. |
|---|---|---|
| [21] | Appl. No. | 750,083 |
| [22] | Filed | Aug. 5, 1968 |
| [45] | Patented | Oct. 19, 1971 |
| [73] | Assignee | Reynolds Metals Company<br>Richmond, Va. |

[54] APPARATUS FOR AND METHOD OF TESTING AND BLOCKING STRIP CONDUCTOR COILS
10 Claims, 6 Drawing Figs.

[52] U.S. Cl. .................................... 324/158 R, 29/593, 324/51
[51] Int. Cl. .................................... G01r 31/02, G01r 31/06
[50] Field of Search .................... 324/73, 51, 54, 158, 158 F, 158 MG, 59, 72.5; 29/593, 602; 269/48.1; 156/275, 184; 336/205

[56] References Cited
UNITED STATES PATENTS

| 2,923,910 | 2/1960 | Golder | 324/158 X |
| 1,329,949 | 2/1920 | Blackwell | 324/59 |
| 1,595,838 | 8/1926 | Turner | 156/275 X |
| 1,908,272 | 5/1933 | Sommer | 29/593 |
| 2,954,521 | 9/1960 | McKee | 324/72.5 |
| 3,009,109 | 11/1961 | Jankowski | 324/158 |
| 3,328,683 | 6/1967 | Davenport | 324/51 |
| 3,370,842 | 2/1968 | Sykes | 269/48.1 X |
| 3,417,327 | 12/1968 | Breidenbach | 324/54 |

Primary Examiner—Rudolph V. Rolinec
Assistant Examiner—Ernest F. Karlsen
Attorney—Glenn, Palmer & Lyne ABSTRACT: This disclosure relates to a simple apparatus for and method of testing and blocking electrical coils made from an elongated strip of electrically conductive material which utilizes a radially expandable mandrel to hold a coil in position so that one or more leads thereof may be easily connected in an associated electrical circuit using rapidly operating electrical connectors comprising the apparatus, and with a given coil thus held it is rapidly tested and if found acceptable the coil is immediately blocked prior to removal thereof from such mandrel.

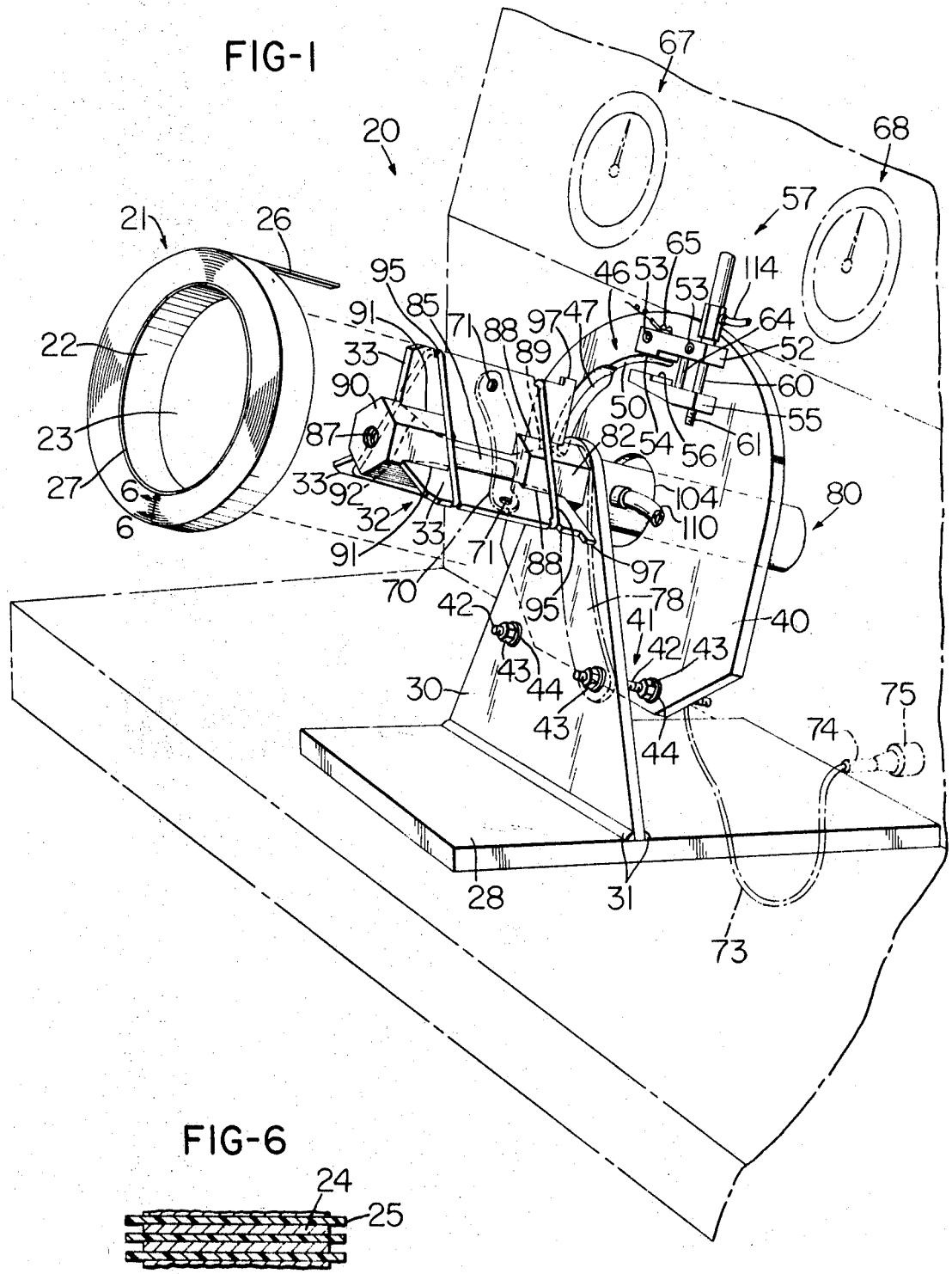

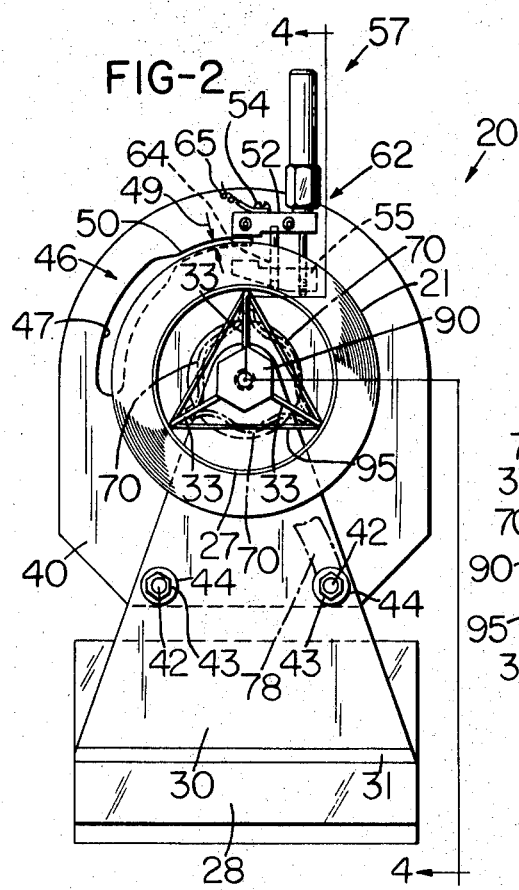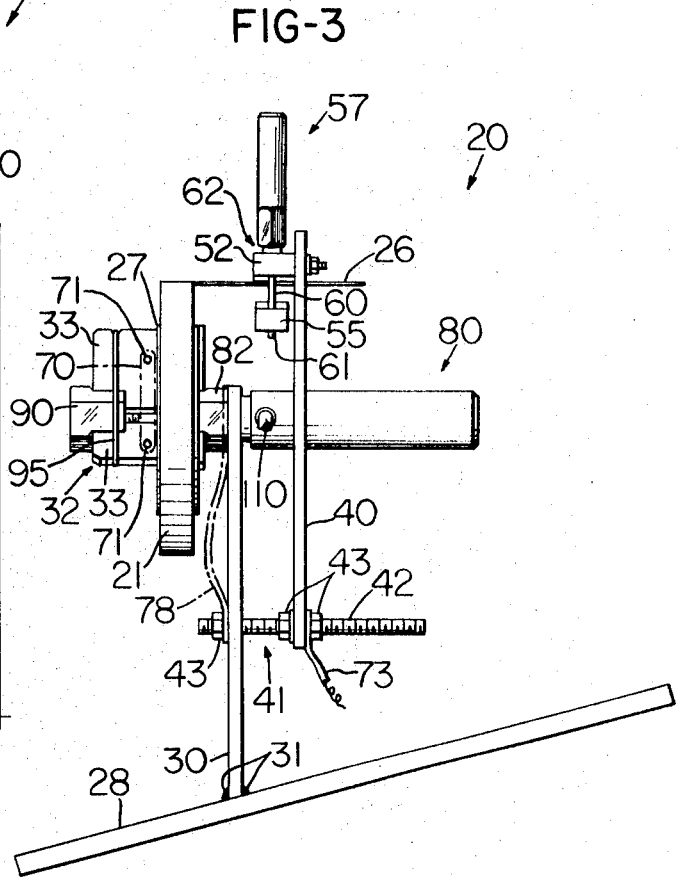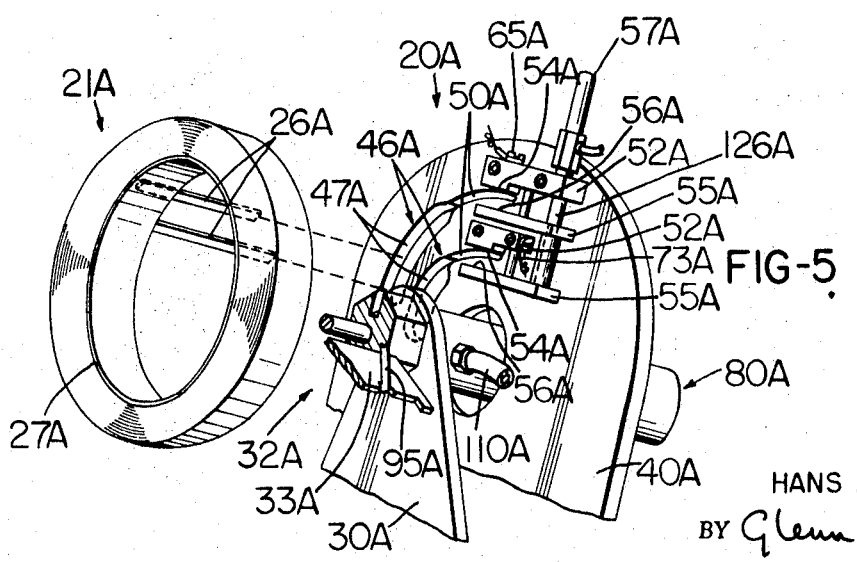

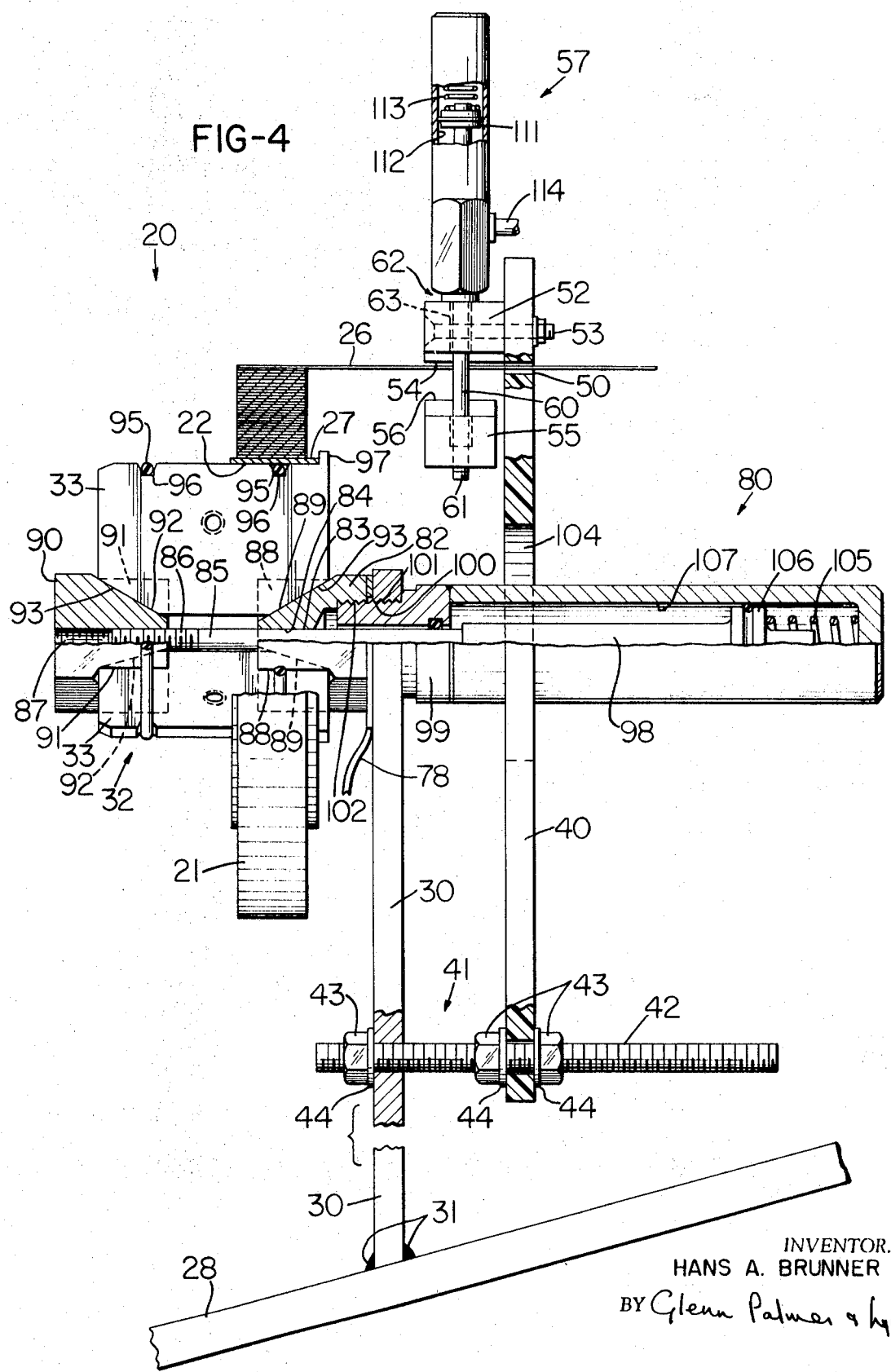

and now U.S. Pat. No. 3,526,835, filed concurrently herewith.
APPARATUS FOR AND METHOD OF TESTING AND BLOCKING STRIP CONDUCTOR COILS

CROSS-REFERENCE TO RELATED APPLICATION

This application is related to application Ser. No. 750,179, now U.S. Pat. No. 3,526,835, filed concurrently herewith.

BACKGROUND OF THE INVENTION

In the manufacture of an electrical strip conductor coil, i.e., an electrical coil made from an elongated strip of electrically conductive material which is wound in coil form with an electrical insulating material between each pair of immediately adjacent turns, it is necessary that such coil be electrically tested to assure that it has the desired number of turns, coil resistance, etc. It is often desirable that a strip conductor coil be "blocked," i.e., electrically heated by using its own resistance so that immediately adjacent turns of the coil are bonded together so that the entire coil is, in effect, a substantially unitary construction.

SUMMARY

This invention provides an improved apparatus for and method of testing and blocking a strip conductor coil wherein each coil is handled a minimum amount and the blocking of each coil is achieved on the same apparatus used to test the coil.

Other details, uses, and advantages of this invention will become apparent as the following description of the embodiments thereof presented in the accompanying drawings proceeds.

BRIEF DESCRIPTION OF THE DRAWINGS

The accompanying drawings show present preferred embodiments of this invention, in which FIG. 1 is a perspective view illustrating one exemplary embodiment of the improved apparatus and method of this invention;

FIG. 2 is a front elevation of the apparatus of FIG. 1;

FIG. 3 is a side elevation of the apparatus of FIG. 1;

FIG. 4 is a view with parts in section and parts broken away on the line 4—4 of FIG. 2;

FIG. 5 is a fragmentary perspective view illustrating another exemplary embodiment of this invention which is particularly adapted to test and block strip conductor coil having a plurality of electrical leads extending outwardly therefrom; and FIG. 6 is an enlarged fragmentary sectional view taken on the line 6—6 of FIG. 1 showing typical electrical insulating layers each arranged between an associated pair of immediately adjacent turns of a coil prior to blocking thereof.

DESCRIPTION OF ILLUSTRATED EMBODIMENTS

Reference is now made to FIG. 1 of the drawings wherein an exemplary apparatus and method of this invention designated generally by the reference numeral 20 is illustrated and which is adapted to enable rapid electrical testing and blocking of an exemplary electrical strip conductor coil 21.

The exemplary coil 21 has a substantially right circular cylindrical peripheral outline and a tubular surface 22 defining a central opening 23 extending therethrough. The coil 21 is made from an elongated strip 24 of an electrically conductive material, see FIG. 6, which is wound in coil form and with an electrical insulating material or strip 25 arranged between each pair of immediately adjacent turns. The insulating material may be of the type which is bonded or sealed to adjoining surfaces upon being suitably heated to thereby block the coil 21 and in a manner to be described in detail subsequently.

The coil 21 shown as being tested on the apparatus 20 of this invention has an outer electrical lead 26 fixed to the terminal end portion of its outer turn and an electrically conductive metal core 27 which, in effect, defines the inner lead of the coil 21. The inside surface of metal core 27 defines the tubular surface 22.

The apparatus 20 comprises a base 28 having a support 30 suitably fixed thereto as by a pair of welds 31 and the support 30 in this example of the invention extends substantially vertically upwardly from the top surface of the horizontal base 28. The support 30 has a radially expandable mandrel designated generally by the reference numeral 32 which is mounted thereon in a cantilevered manner and the mandrel 32 is adapted to be extended within the opening 23 of coil 21 and radially expanded causing a plurality of three radially extending gripping plates each designated by the reference numeral 33 and comprising the mandrel 32 to be moved radially against the tubular surface 22 to engage and hold the coil 21 firmly in position after suitably placing such coil on the mandrel 32. The apparatus 20 also has electrical connectors, to be described in detail subsequently, which enable the coil 21 to be electrically connected in an associated electrical circuit while it is firmly held on the mandrel 32 to enable electrical testing of the coil 21 and substantially instantaneously thereafter the blocking of such coil if its electrical characteristics such as resistance, inductance, etc. are found acceptable.

The apparatus 20 has a mounting plate 40 supported adjacent the mandrel 32 and in this example of the invention the mounting plate 40 is arranged substantially parallel to the support 30 and is fixed thereto by a pair of fasteners each designated generally by the reference numeral 41 so that the mounting plate 40 is also arranged vertically and is supported by fasteners 41 in parallel spaced apart relation from the support 30. Each fastener 41 may be made in any suitable manner; however, in this example of the invention each fastener 41 is comprised of an elongated threaded bolt 42 which is used together with a plurality of threaded nuts 43 and associated washers 44 which are suitably threaded in position in the manner illustrated in the drawings to firmly attach the plate 40 to the support 30 so that the plate 40 is arranged rearwardly of the support 30.

The mounting plate 40 may be made of a rigid plasticlike material which is an electrical insulator, for reasons which will be apparent hereinafter, and yet is comparatively inexpensive. In one application of this invention a mounting plate 40 made of nylon was successively utilized.

The plate 40 has an elongated slot designated generally by the reference numeral 46 extending therethrough and slot 46 extends in an arcuate path through the mounting plate 40. The slot 46 is comprised of a comparatively large area portion 47 which blends smoothly at one end thereof with a smaller area portion 50 which has a narrow transverse dimension, indicated at 49, for reasons which will be apparent hereinafter.

The mounting plate 40 has a member in the form of a contact bar 52 fixed thereto by a pair of fastening bolts 53 so that the fixed bar 52 and in particular a planar contact surface 54 thereof is arranged on one side of the slot 46 and in this example of the invention the bar 52 is arranged immediately adjacent the top side of the small area portion 50 of the slot 46.

The mounting plate 40 of apparatus 20 also has an actuator 57 mounted thereon and the actuator 57 has an electrical contact bar 55 fastened thereto which is provided with a surface 56 which is arranged adjacent the lower side of the slot 46.

The actuator 57 in this example of the invention is in the form of a pneumatic actuator which has a telescoping rod portion 60 provided with a threaded outer end 61 which is threaded through the electrical contact bar 55 and upon actuating the actuator 57 the telescoping rod 60 is retracted thereby moving the contact bar 55 and its contact surface 56 toward the fixed bar 52 and against the contact surface 54.

The pneumatic actuator 57 is suitably fastened to the fixed bar 52 as shown at 62 and the telescoping rod 60 thereof extends through a bore 63 provided in the fixed member 52 so that rod 60 may move freely therethrough in an unobstructed manner. A guide pin 64 is also provided and has one end fixed to the fixed bar 52 so that its opposite end portion is adapted to extend through a cooperating bore in the movable contact 55 and guide its movement toward and away from the fixed bar 52.

The fixed contact bar 52 has a suitable electrical lead 65 fixed thereto which is in turn connected to an electrical circuit comprising a pair of apparatus 20. The electrical circuit may be of known construction and is provided with suitable indicating instruments; and, a typical pair of indicating dials of such instruments are shown at 67 and 68.

As previously indicated the exemplary apparatus 20 is particularly adapted for testing a strip conductor coil 21 which has the electrically conductive metal core 27 against which the innner turn of the strip conductor coil 21 is wound and held in electrical contact. The radially movable plates 33 are made of an electrically conductive material and to assure that the plates 33 are electrically connected together a plurality of three electrical leads of large cross-sectional area and each designated by the same reference numeral 70 are suitably fastened to the plates 33. Each lead 70 is fastened between a pair of associated plates 33 by a pair of fastening screws 71.

The apparatus 20 also has an electrical lead 73 which is suitably connected to the above-mentioned electrical circuit at one end and to the electrically conductive support member 82 of mandrel 32 through a fastening bolt 42 and a large cross-sectional area lead 78 at its opposite end whereby all of the plates 33 and leads 70 are electrically connected together and to the lead 73. The lead 73 also has a quick-disconnect male plug 74 of known construction fixed thereto which is inserted within a cooperating receptacle 75 which comprises part of the previously mentioned electrical circuit.

The apparatus and method 20 of this invention enables the electrical coil 21 to be simply and efficiently tested and blocked merely by placing the coil in position on the radially expandable mandrel 32 so that the lead 26 thereof extends through the large area portion 47 of the elongated slot 46 and with the coil 21 thus placed in position it is simply rotated clockwise, as viewed in FIG. 1 of the drawings, so that the lead 26 is rotated within the small area portion 50 of slot 46 and substantially aligned between the contact surface 54 of fixed contact bar 52 and the contact surface 56 of the movable contact 55. The radially expandable mandrel 32 is then actuated causing the outer edges of the plates 33 to engage the inside tubular surface 22 and firmly hold the coil 21 in position. With the coil 21 thus held in position and substantially simultaneously thereafter, the pneumatic actuator 57 is actuated so that the lead 26 extending from coil 21 is clamped between contact surfaces 54 and 56 to electrically connect the lead 26 to the dual-function testing and blocking circuit through the electrical connection provided by contact bar 52 and lead 65 fixed thereto.

Reference is now made to FIG. 4 of the drawings for a more detailed illustration of the exemplary radially expandable mandrel 32 and an actuator 80 provided therefor as well as the actuator 57 used to move the movable contact bar 55. Although the actuators 57 and 80 may be of any suitable type, in this example of the invention each of such actuators is in the form of a pneumatic actuator which has a telescoping rod portion which is normally extended and held outwardly by a suitable spring and in each instance upon actuating the particular actuator its associated spring is overridden by pneumatic pressure to enable retraction of the rod.

The mandrel 32 comprises a first member 82 which is fastened in position against the vertical support 30 so that the mandrel 32 extends forwardly from the front face of the support 30. The member 82 has a cylindrical surface 83 which defines an axial bore 84 extending therethrough and the cylindrical surface 83 is adapted to slidably support a shaft 85 comprising the mandrel 32 for axial sliding movement therealong. The shaft 85 has a threaded terminal end portion 86 which is adapted to be threaded in a threaded bore 87 of a second or outer member 90 comprising the radially expandable mandrel 32.

The members 82 and 90 are shown in the drawings as having a hexagonal cross-sectional outline; however, it is to be understood that such members may have any desired cross-sectional outline such as circular, triangular, etc.

Each member 82 and 90 of mandrel 32 has a plurality of three grooves extending symmetrically therearound. Each of the grooves in member 82 is designated by the same reference numeral 88 and is defined by a substantially radially extending pair of spaced apart side surfaces and an inclined cam surface 89 defining the bottom of such groove. Similarly, each of the grooves in member 90 is designated by the same reference numeral 91 and is defined by a substantially radially extending pair of spaced apart side surfaces and an inclined cam surface 92 defining the bottom of such groove.

Each of the plates 33 of mandrel 32 has a pair of inclined cam surfaces 93 which are inclined in opposite directions and define its opposite innner corner edges. The plates 33 are adapted to be moved radially outwardly away from the shaft 85 upon moving the shaft 85 toward the support 30 and as will be described in more detail subsequently.

The members 82 and 90 comprising mandrel 32 have their inclined cam surfaces 89 and 92 respectively which are inclined in opposite directions and each cam surface 89 and 92 is adapted to support a cooperating inclined cam surface 93 at one end of an associated plate 33. A pair of stretchable rings 95 each made of a rubberlike material are each inserted within associated rectangular cutouts 96 provided in each plate 33. The rings 95 normally yielding urge the plates 33 radially inwardly toward and against the shaft 85.

Each coil 21 to be tested on apparatus 20 is slid axially along mandrel 32 until the inside edge of its core 27 strikes a raised shoulder 97 provided at the inner end of each plate 33 and the lead 26 extends through portion 47 of slot 46. The coil 21 is then rotated clockwise so that its lead is moved within the narrow width portion 50 of slot 46 so that it is aligned between the surfaces 54 and 56 and is thus positioned quite close to surface 54 thereby requiring minimum flexing of lead 26 upon clamping such lead against surface 54. The shaft 85 is then actuated thereby moving member 90 toward the support 30 whereby the cam surfaces 93 at opposite ends of plates 33 are engaged and cammed by the inclined cam surfaces 89 and 92 members 82 and 90 respectively whereby each gripping plate 33 is moved radially outwardly and in firm contact with the inside surface 22 to firmly engage and hold the coil 21 in position. Each plate 33 is guided during radial movement thereof by the side surfaces defining the sides of its associated grooves.

The shaft 85 comprising mandrel 32 is shown as a separate shaft portion which is suitably fixed as by threading, pressfitting, etc. to a telescoping rod or shaft 98 comprising the actuator 80; however, it will be appreciated that the shaft 85 and the rod portion 98 may be made as one piece, if desired.

The pneumatic actuator 80 has a forward end portion 99 provided with a threaded support 100 which is threaded through a threaded opening 101 provided in the support 30 so that the actuator 80 is supported by support 30 in a substantially cantilevered manner. THe rear member 82 of mandrel 32 has female threads 102 provided therein and member 82 is threaded over the threaded terminal end of threaded support 100. Thus, the member 82 is supported by the support 30 and simultaneously fastened and aligned so that shafts 85 and 98 operate, in effect, as one elongated unit. The rear end portion of actuator 80 extends through a large diameter cylindrical opening 104 provided in the mounting plate 40 which enables passage of such rear end portion therethrough in an unobstructed manner.

The pneumatic actuator 80 has its rod or shaft 98 normally yieldingly urged outwardly by a compression spring 105 and also has a suitable piston 106 supported for sliding movement within an associated bore 107 provided in the actuator cylinder. The pneumatic actuator is an air operated actuator which has air under regulated pressure ported thereto through an air conduit 110. Upon actuating the actuator 80 air is ported to the forward face of piston 106 thereby overriding spring 105 and moving shafts 98 and 85 rearwardly. As the shaft 85 is moved toward support 30 the action of cam surfaces 89, 92, and 93 causes radial movement of the gripping plates 33 as previously described. Once the air pressure to the forward face of the piston 106 is removed the spring 105 returns the shafts 98 and 85 forwardly and the resilient rings 95 move the plates 33 radially inwardly from the cylindrical surface 22 of a coil 21 being tested and blocked to release such coil from the holding action of the mandrel 32.

The pneumatic actuator 57 has its telescoping rod 60 provided as an integral part thereof as previously mentioned and the actuator 57 is suitably fastened to the member 52 so that in this example of the invention the actuator 57 extends substantially vertically above the member 52. The pneumatic actuator 57 comprises an air operated actuator and has an axially slidable piston 111 which is supported for sliding movement within a cooperating bore 112 provided in the cylinder portion of the actuator 57 in a known manner. A compression spring 113 is provided for yieldingly urging the piston 111 and its rod 60, which is suitably fixed to piston 111, outwardly.

The actuator 57 is provided with a source of air under regulated pressure through a conduit 114 and in a similar manner as described in connection with the pneumatic actuator 80. THe air ported through conduit 114 acts against the piston 111 and overrides the spring 113 to retract the rod 60. As the rod 60 is retracted it moves the contact surface 56 of contact bar 55 toward and against the contact surface 54 of the fixed contact bar 52. Upon removing the air pressure from conduit 114 the spring 113 extends the rod 60 outwardly and thereby moves the contact surface 56 away from the contact surface 54.

It is a simple matter to test and block a coil 21 by placing such coil on mandrel 32 with its lead 26 being easily extended through the large area portion 47 of slot 46 and then rotating coil 21 until its lead 26 is aligned between contact surfaces 54 and 56. With the coil thus positioned the actuator 80 is energized thereby radially expanding the plates 33 outwardly against the inside surface 22 to hold such coil in position and substantially simultaneously the actuator 57 is also energized thereby causing the rod 60 to be retracted and the lead 26 to be firmly clamped between the contact surfaces 54 and 56.

With the lead 26 thus clamped in position an electrical connection is completed between the fixed contact bar 52 and through the lead 65 which is fixed to contact bar 52 whereby an outer turn of the coil 21 is electrically connected with the previously mentioned associated electrical circuit. The movement of the griping plates 33 radially outwardly by actuating pneumatic actuator 80 connects the metallic core 27 and hence an adjoining inner turn of the coil 21 with the lead 73 which is also connected to the above mentioned electrical circuit.

With the coil 21 electrically connected in the above-mentioned electrical circuit in the manner described above a predetermined first potential or voltage, for example, is applied across the coil to determine whether the coil is acceptable. Upon determining that such coil is acceptable a predetermined second potential is then applied across the coil 21 causing an increased flow of current through the coil to thereby resistance heat and block the coil by fusing or bonding the insulating material 25 provided between each pair of immediately adjacent turns of the coil against adjoining surface portions of the elongated strip 24 of electrically conductive material. FIG. 6 illustrates adjoining turns of such strips prior to blocking thereof.

The elongated strip of electrically conductive material 24 used to make coil 21 may have a suitable coating of electrical insulating material such as a coating 25 of a suitable epoxy resin, for example, applied against one surface thereof. The elongated strip 24 may also be wound in coil form in unison with a suitable elongated separate strip 25 of electrical insulating material interleaved between adjoining turns in a known manner. In either case, upon increasing the potential across the coil 21 to provide a resistance heating thereof the electrical insulating material 25 is bonded or blocked against adjoining surfaces of the strip of electrically conductive material 24 to provide a blocked coil which is in the form of an integral unit.

It will be appreciated that each electrical coil 21 tested on the improved apparatus of this invention may be tested by measuring the desired electrical characteristics of the coil individually and suitably recording such characteristics; however, one technique which has been successfully employed is to compare the electrical characteristics of the coil being tested with a standard coil which is suitably connected in the circuit. In particular, it may be preferred in some applications to utilize a standard coil, i.e., a coil having precisely known electrical characteristics, in such electrical circuit in association with a go-no-go bridge so that the characteristics of a coil 21 being checked may be determined at a glance merely by viewing the indicating dials 67 and 68, for example.

A detailed presentation of the electrical circuitry which may be utilized in association with the improved apparatus 20 of this invention has not been presented in this disclosure. However, it will be appreciated that any suitable electrical circuitry may be utilized which has component parts which enable the application of different potentials or voltages across the coil 21 to provide a resistance heating of each coil 21. Also, the resistance heating may be provided in a suitable circuit by controlling the current flow through each coil being tested and blocked without using a higher potential or voltage to provide the increased current flow and hence a higher temperature in the coil 21 for blocking purposes.

Another exemplary embodiment of this invention is illustrated in FIG. 5 of the drawings wherein the apparatus and method illustrated in FIG. 5 is very similar to the apparatus 20; thus, the apparatus of FIG. 5 will be designated generally by the reference numeral 20A and component parts thereof which are substantially similar to corresponding parts of apparatus 20 will be designated by the same reference numeral as in the apparatus 20 also followed by the letter designation A and not described again. Only those component parts which are substantially different from corresponding parts of apparatus 20 will be designated by a new reference numeral also followed by the letter designation A and described in detail.

The apparatus 20A is particularly adapted to test an exemplary electrical coil 21A which has a plurality of two electrical leads shown as an inner and outer lead each designated by the same reference numeral 26A and extending outwardly from coil 21A. The exemplary coil 21A has a central tubular core 27A which is made of an electrically insulating material thus the inner lead 26A which adjoins the core 27A is electrically connected with an inner turn of coil 21A while the outer lead 26A is electrically connected to an outer turn of coil 21A. The coil 21A is also made of an elongated strip of electrically conductive material and is provided with insulating material between immediately adjacent turns and in several ways as described in connection with coil 21.

As will be apparent from FIG. 5 of the drawings the mounting plate 40A of apparatus 20A has a plurality of two spaced apart slots each designated by the same reference numeral 46A extending therethrough. Each slot 46A has a wide area portion 47A and a comparatively narrow small area portion 50A provided therein in a similar manner as previously described in connection with slot 46 and each of the two slots 46A is adapted to receive an associated lead 26A therethrough.

The apparatus 20A also has a plurality of contact blocks each designated by the same reference numeral 52A fixed to its plate 40A and each block 52A is arranged with a contact surface 54A thereof adjacent one side of an associated slot 46A. A plurality of movable electrical contacts each designated by the same reference numeral 55A and each having a contact surface 56A is provided and supported by the mounting plate 40A. Each movable contact 55A is utilized with an associated fixed block 52A and in a similar manner as described in detail connection with the blocks 52 and 55 of the apparatus 20.

In this embodiment of the invention an electrical lead 73A is provided and suitably fastened to the lower fixed contact block 52A and the lead 73A is fastened in position in the electrical circuit described in connection with apparatus 20. Thus, upon placing a coil 21A on mandrel 32A of apparatus 20A it will be seen that the inner turn of such coil is connected to such electrical circuit upon clamping the inner lead 26A against block 52A. Similarly the outer lead 26A is fastened to such electrical circuit by a lead 65A fixed to outer block 52A upon clamping such outer lead to the outer block 52A.

The actuator 57A of apparatus 20A has a telescoping rod 126A extending outwardly therefrom which is considerably longer than rod 60 to accommodate the provision of two contact blocks 55A fixed thereto. The actuator 57A may be supported in position on plate 40A utilizing only the upper fixed block 52A and it will be seen that the lower block 52A provided in association with the lower slot 46A is of a comparatively shorter length than the upper block 52A to enable the rod 126A to move thereby in an unobstructed manner.

The rod 126A may be made of a rigid electrical insulating material to assure that there will be no electrical shorting of the two leads 26A and that a distinct electrical path is provided through the lower contact block 52A and inner lead 26A and through the upper contact block 52A and outer lead 26A upon actuating the pneumatic actuator 57A.

In operation it will be appreciated that the apparatus 20A is utilized essentially in the same manner as apparatus 20 and an electrical coil 21A to be tested and blocked is placed in position over the radially expandable mandrel 32A. The coil 21A is then rotated clockwise to bring each of its leads 26A in alignment between an associated pair of contact surfaces 54A and 56A and with the coil 21A thus rotated the actuators 80A and 57A are energized thereby firmly clamping the coil 21A in position on the mandrel 32A and substantially simultaneously thereafter clamping the leads 26A against associated fixed blocks 52A so that the inner lead 26A is connected to lead 73A and the outer lead 26A is connected to lead 65A. The testing and blocking of coil 21A is achieved in a similar manner as described in detail in connection with coil 21 and therefore will not be repeated. Thus, it will be appreciated that the apparatus 21A operates essentially in a similar manner as apparatus 20 and enables the testing of a coil 21A which has a plurality of electrical leads extending outwardly therefrom.

It will also be appreciated in connection with the apparatus of this invention that it may be desired to provide a plate similar to plate 40A which has an even greater number of slots 46A extending therethrough to thereby enable testing of an electrical coil which may have a corresponding larger number of leads extending outwardly therefrom which may comprise a primary winding, secondary winding, etc., of that particular coil. In addition, it will be appreciated that the electrical leads extending outwardly from the particular coil may be arranged at any desired peripheral position around the coil and need not necessarily be aligned as shown in connection with coil 21A illustrated in FIG. 5, and in this latter instance the slots in a plate similar to plate 40A would be arranged at corresponding positions.

While present exemplary embodiments of this invention, and methods of practicing the same, have been illustrated and described it will be recognized that this invention may be otherwise variously embodied and practiced within the scope of the following claims.

What is claimed is:

1. An apparatus for testing and blocking an electrical coil which has a tubular surface defining an opening therethrough; said apparatus comprising; a support; a radially expandable mandrel mounted on said support and adapted to extend within said opening of said coil and be radially expanded against said tubular surface to hold said coil firmly in position; said radially expandable mandrel comprising a first device fixed on said support and having a first cam surface provided thereon, a second device supported for axial movement adjacent said first device and having a second cam surface provided thereon, and at least one gripping means having a pair of cooperating cam surfaces defining inner corners thereof and being yieldingly supported in position with each of its cooperating cam surfaces engaging the cam surface of an associated device, and actuating means for moving said second device toward said first device causing said gripping means to be cammed radially outwardly by said cam surfaces and urged against said tubular surface to hold said coil firmly in position; an electrical circuit; a connector including a fixed contact member and a movable contact member supported for movement toward and away from said fixed contact member, one of said members being electrically connected to said electrical circuit; and means for moving one of said members into clamping engagement with the other of said members whereby a lead of a coil may be clamped between said members thereby forming an electrical path including said circuit, said connector, and said coil to enable said testing and blocking of said coil.

2. An apparatus as set forth in claim 1 further comprising a mounting plate supported adjacent said mandrel, wherein said fixed contact member is fastened to said plate.

3. An apparatus as set forth in claim 1 further comprising a mounting plate supported adjacent said mandrel and having an elongated opening therein adapted to receive a lead of a coil through said opening wherein said fixed contact member is fastened to said plate.

4. An apparatus as set forth in claim 2 in which said mounting plate is made of an electrical insulating material and is supported by said support.

5. An apparatus as set forth in claim 2 and further comprising an actuator supported by said plate, said actuator having said movable contact member fastened thereto and being adapted to move said movable contact member toward and away from said fixed contact member.

6. An apparatus as set forth in claim 2 in which said plate is made of an electrical insulating material and is supported by said support and in spaced apart relation therefrom and said apparatus further comprises a fluid operated actuator supported by said plate and having a telescoping terminal end portion, said movable contact member being fastened to said terminal end portion for movement therewith and toward and away from said fixed contact member in a substantially rectilinear path.

7. An apparatus for testing and blocking an electrical coil which has a tubular surface defining an opening therethrough; said apparatus comprising; a support, a radially expandable mandrel mounted on said support and adapted to extend within said opening of said coil and be radially expanded against said tubular surface to hold said coil position; in position said radially expandable mandrel comprising, a first member fixed on said support, said first member having a first set of inclined cam surfaces provided thereon and a central cylindrical surface defining a central bore extending therethrough, a central shaft slidably supported within said cylindrical surface for axial movement back and forth therealong, a second member having a second set of cooperating inclined cam surfaces provided thereon, said second member being attached to the terminal end portion of said shaft, a plurality of gripping plates each having a pair of cooperating inclined cam surfaces defining its inner corners and being yieldingly held against said shaft and with each cooperating cam surface engaging an inclined cam surface of an associated member, and an actuator for axially moving said shaft and second member toward said first member causing said plates to be cammed radially outwardly by said cam surfaces and urged against said tubular surface to hold said coil firmly in position; and a connector for electrically connecting said coil to an associated electrical circuit with said coil held on said mandrel to enable testing and blocking of said coil.

8. An apparatus as set forth in claim 7 in which said actuator comprises a fluid operated actuator having a telescoping shaft portion which defines the terminal inner end of said central shaft for movement thereof in a rectilinear path, said actuator having said telescoping shaft position normally urged outwardly thereby moving said central shaft outwardly and allowing said plates to be moved against said central shaft.

9. An apparatus as set forth in claim 8 and further comprising a stretchable O-ring normally yieldingly holding said plates against said central shaft, said O-ring being stretched outwardly upon actuating said actuator and camming said plates radially outwardly.

10. An apparatus for testing and blocking an electrical coil which has a tubular surface defining an opening therethrough, said apparatus comprising, a support, an expandable mandrel mounted on said support and being adapted to extend within the opening of a coil, means for expanding said mandrel to hold a coil in position, an electrical circuit, a mounting plate supported adjacent and transverse to said mandrel and having a plurality of spaced apart elongated openings therein with each elongated opening having a large area portion near one end and being to receive an associated lead of a coil therethrough, a plurality of connectors including a first connector, said first connector being fastened to said plate adjacent an associated opening and including a fixed contact member and a movable contact member supported for movement toward and away from said fixed contact member, said first connector being electrically connected to said electrical circuit, each of said elongated openings also having a small area portion for guiding a lead between associated contact members, means for moving the movable member of said first connector into clamping engagement with its associated fixed member whereby a lead of a coil may be clamped between the members of the first connector thereby forming an electrical path including said circuit, the first connector, and the coil to enable testing and blocking of the coil.